United States Patent [19]

Kordik

[11] Patent Number: 5,164,622
[45] Date of Patent: Nov. 17, 1992

[54] HIGH POLE DENSITY THREE PHASE MOTOR

[75] Inventor: Jeffrey A. Kordik, Aptos, Calif.

[73] Assignee: Applied Motion Products, Inc., Scotts Valley, Calif.

[21] Appl. No.: 538,256

[22] Filed: Jun. 14, 1990

[51] Int. Cl.$^5$ ............................................. H02K 11/00
[52] U.S. Cl. .................................. 310/67 R; 310/156; 310/198; 310/254
[58] Field of Search ............... 310/67 R, 66, 156, 198, 310/254, 258, 259, 90, 184, 185, 261

[56] References Cited

U.S. PATENT DOCUMENTS

| | | | |
|---|---|---|---|
| 4,255,682 | 3/1981 | Toida et al. | 310/198 |
| 4,692,645 | 9/1987 | Gotou | 310/184 |
| 4,774,428 | 9/1988 | Konecny | 310/198 |
| 4,843,270 | 6/1989 | Dijken | 310/164 |
| 4,847,526 | 7/1989 | Takehara et al. | 310/185 |
| 4,853,567 | 8/1989 | Muramatsu et al. | 310/90 |
| 4,882,511 | 11/1989 | van der Heide | 310/67 R |
| 5,015,903 | 5/1991 | Hancock et al. | 310/168 |

Primary Examiner—Steven L. Stephan
Assistant Examiner—Matthew Nguyen
Attorney, Agent, or Firm—Michael J. Hughes

[57] ABSTRACT

A three phase DC motor (10) including a rotor portion (12) and a stator portion (16). The rotor portion (12) includes 6N±2 permanent magnet poles (32), and the stator portion (16) includes 6N electromagnet poles where N in an integer. The motor (10) is characterized in that it has a high pole density, thus enabling improved efficiency, while retaining acceptable non constant torque characteristics. Since the inventive motor configuration provides for a symmetrical winding pattern, no assymetrical radial forces are produced. The inventive configuration further allows for small motor size in the height dimension. A first preferred embodiment of the motor (10) is adapted for three phase power to be connected to the motor windings (50), (56) and (58) in a "Y" fashion. An alternate preferred embodiment of the invention (610) has coil windings (650), (656) and (658) connected in delta configuration.

3 Claims, 6 Drawing Sheets

| HALL DEVICE STATUS | | | DRIVER OUTPUTS | | | DEGREES OF ROTATION |
|---|---|---|---|---|---|---|
| A | B | C | − | + | OFF | |
| 1 | 0 | 1 | A | B | C | 0 |
| 1 | 0 | 0 | A | C | B | 12 |
| 1 | 1 | 0 | B | C | A | 24 |
| 0 | 1 | 0 | B | A | C | 36 |
| 0 | 1 | 1 | C | A | B | 48 |
| 0 | 0 | 1 | C | B | A | 60 |

HIGH POLE DENSITY THREE PHASE MOTOR

TECHNICAL FIELD

The present invention relates generally to electrical motors and more particularly to three phase direct current (DC) electrical motors. The predominant current usage of the improved three phase DC motor assembly of the present invention is as a replacement for conventional three phase DC motors in various devices, including magnetic media disk drives used in the data processing industry.

BACKGROUND ART

A great variety of modern electronic devices use continually rotating electrical motors. Accordingly, a wide variety of types of motors and innovations applicable to motors have been developed to meet the needs of the diversity of demand. As the surrounding technology has advanced, the demand for brushless DC motors of greater efficiency and of smaller size has increased. Particularly, high efficiency, as gauged by a high torque output to coil winding resistance ratio, is considered to be critical. Of course, a motor of higher efficiency uses less power to produce a given amount of torque than does a comparable motor and is thus especially desirable.

The Brushless DC Motor Assembly with Improved Stator Pole of U.S. Pat. No. 4,499,407, issued to Macleod, is an example of a prior art brushless DC motor which, while offering several advantages over other prior art motors and being quite useful for its intended purpose, is not small enough in the height dimension or efficient enough, and does not operate smoothly enough to meet some of the specific needs which have developed in the industry since the issuance of the patent.

Several of the recent innovations relating to brushless DC motors have been improvements regarding changes in the number and/or configuration of permanent magnetic poles and electromagnetic poles utilized in the design. U.S. Pat. No. 4,774,428, issued to Konecny, teaches a motor having $3(2n+1)\pm 1$ permanent magnet poles and $3(2n+1)$ electromagnetic poles (and, consequently, $3(2n+1)$ "slots" between electromagnetic poles). The Konecny patent offers a motor of improved size and efficiency. However, still greater improvements in size and efficiency are desirable.

Furthermore, the solution to the efficiency problem provided by the Konecny patent results in a motor with an asymmetrical coil winding pattern and, therefore, significant asymmetrical radial forces. These asymmetrical radial forces are particularly offensive in applications where the motor operates under heavy loads.

In addition to size and efficiency, another important factor in many motor applications is the smoothness of the motor torque output curve. Smooth torque output is interrupted by cogging or detent torque, and by EMF ripple. Cogging torque is caused by periodic alignment of attractive magnetic elements. EMF ripple results from the fact that all of the stator poles energized in a given commutation state are not "in phase" with each other. The greater the phase difference, the greater is the EMF ripple. Also, the frequency of these interrupting torques is important, with higher frequencies being less objectionable.

In addition to the above, a motor must be designed with sufficient minimum starting torque for its intended application.

Therefore, while there is no "ideal" brushless DC motor, many users of motors would like a motor of reduced size with increased efficiency that keeps torque ripple within acceptable limits and has acceptable starting torque. Of course, such a motor would have to be capable of being economically manufactured and would ideally be compatible with existing and proposed available power sources.

Yet another consideration is selection of the type of circuitry to be used to supply electrical power to the motor. This decision is based upon a trade off of circuit complexity against the desirable characteristics of smooth running torque, self-starting action, and high starting torque. For applications such as those intended for the inventive motor, 3-phase bipolar electrical power circuitry has been found to be an optimal compromise and is widely used in the field.

Yet another consideration is the fact that there is a demand to make motor poles as small as possible in order to minimize the overall height of the motor, but that this effort is often in conflict with other overall objectives such as smooth operating torque.

All prior art brushless DC motors within the inventor's knowledge are either too large in at least the height dimension or too inefficient to be well suited for such applications as fixed disk drive motors in portable battery operated computers, or else they otherwise suffer undesirable properties such as excessive asymmetrical radial forces or excessive torque ripple. No prior art DC motor to the inventor's knowledge has successfully combined both the small size and the efficiency of the present inventive motor while maintaining acceptable torque characteristics and preventing the production of excessive asymmetrical radial forces.

DISCLOSURE OF INVENTION

Accordingly, it is an object of the present invention to provide a brushless DC motor that is smaller than comparable prior art DC motors in at least the critical height dimension.

It is another object of the present invention to provide a motor that is more efficient than comparable prior art DC motors.

It is a further object of the present invention to provide a motor that combines small size and increased efficiency while retaining acceptable torque characteristics.

It is yet another object of the present invention to provide a motor that does not produce significant asymmetrical radial forces.

It is yet another object of the present invention to provide a motor wherein any detent torque produced therein is produced at a relatively high frequency.

It is still another object of the present invention to provide a motor that can be economically manufactured and used.

This invention relates to a brushless DC motor having permanent magnetic poles and electromagnetic stator poles both of a quantity and configuration such that motor efficiency is improved and motor height is reduced while resultant asymmetrical forces and ripple torque are minimized. In general, efficiency is increased by increasing the number of permanent magnetic poles and electromagnetic poles, thus distributing magnetic fields and coil winding wire so as to gain maximum efficiency. A configuration and relative positioning of magnetic elements is disclosed which makes possible this means of increasing efficiency without unacceptable sacrifice of torque characteristics.

A first presently preferred embodiment of the invention is an application of the inventive configuration of elements embodied in a "Y" connected three phase motor. An equally preferred alternate embodiment is an application of the inventive configuration embodied in a "Delta" connected three phase motor.

An advantage of the present invention is that it is more efficient in terms of torque produced per power consumed than comparable prior art DC motors.

Another advantage of the present invention is that it is smaller, particularly in the height dimension, than prior art motors capable of producing a comparable torque curve output.

A further advantage of the present invention is that it will allow a disk drive to be operated for longer periods time per depletable fixed power source.

Yet another advantage of the present invention is that it does not produce asymmetrical radial forces, and thus does not transfer such forces to a driven apparatus.

Yet another advantage of the present invention is that it provides a motor with increased efficiency and minimal undesirable torque characteristics.

Yet another advantage of the present invention is that relatively inexpensive to manufacture and commonly available three phase commutation circuitry may be used without sacrifice of torque characteristics.

Yet another advantage of the present invention is that motor starting torque per available power is increased.

BEST MODE FOR CARRYING OUT INVENTION

Figure 1:
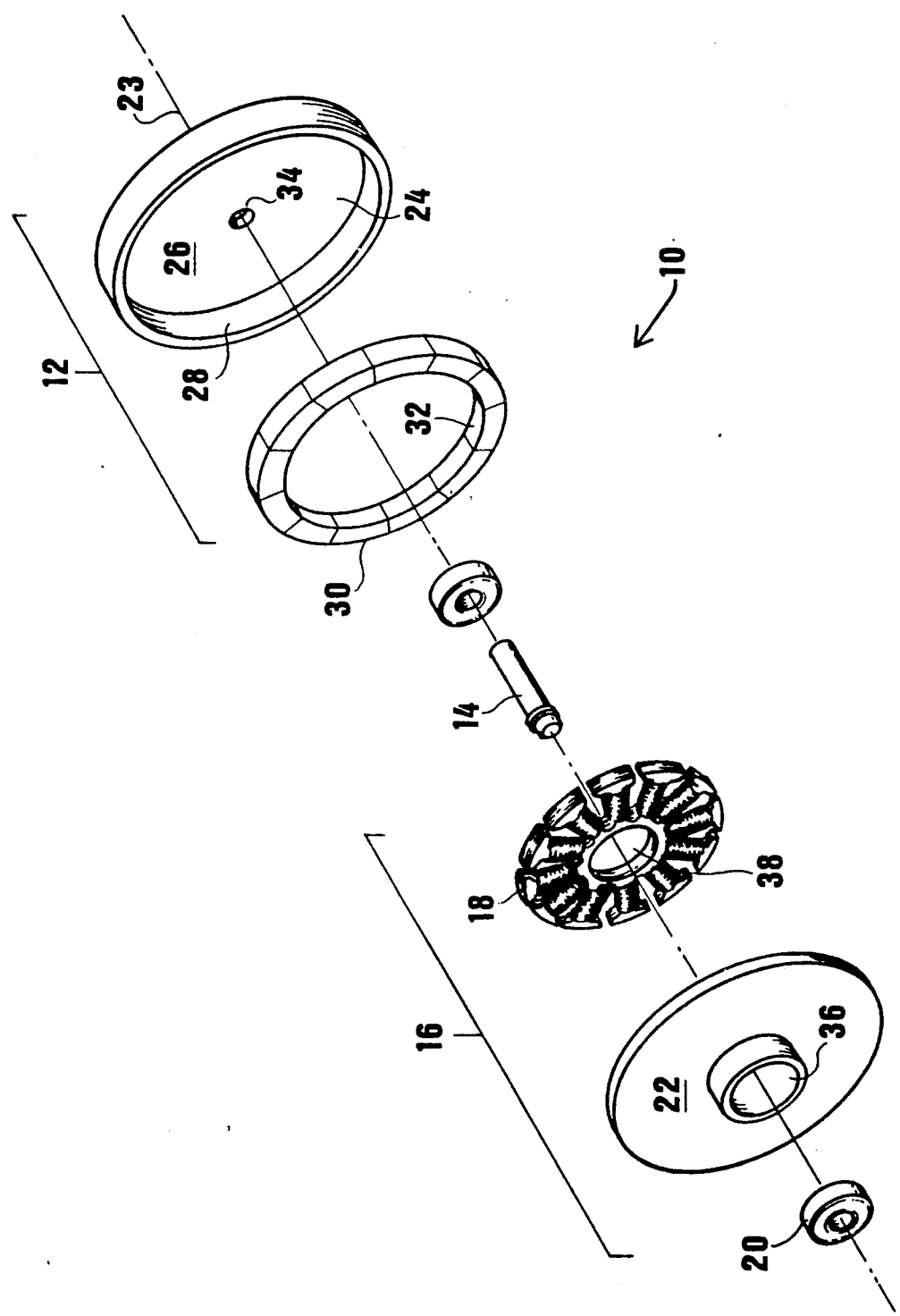
FIG. 1 is an exploded perspective view of a three phase high pole density direct current electrical motor according to the present invention.

The best presently known mode for carrying out the invention is a brushless DC motor constructed such that the necessary length of coil wire per winding is minimized, thereby greatly increasing motor efficiency. Moreover, the motor of the present invention is configured such that this benefit is attained without producing the extreme asymmetrical radial forces associated with prior art attempts at increased efficiency, and without producing undue detent torque A first preferred embodiment of the invention uses a "Y" connected coil arrangement, and an equally preferred alternate embodiment uses a "Delta" connected coil arrangement.

One means of increasing efficiency is to minimize the length of coil winding wire required per coil winding turn. Since output torque is a function of the total number of winding turns present on the stator poles and is not a function of the length of these windings, and since the total length of coil winding wire is directly proportional to the power dissipated by the motor (and, thus, is indirectly proportional to motor efficiency), efficiency can be increased by reducing the winding wire length per turn ratio. One way of doing this is to increase the number of poles. This results in a decreased wire winding length per turn ratio in the following ways:

A) When using a greater number of poles, total flux per pole is reduced, and thus the total amount of flux crossing from one pole to the next is reduced, allowing for a smaller cross-sectional area of rotor and stator backiron while maintaining the same peak flux densities as a conventional brushless DC motor. This allows for reductions in size, weight and material cost, and further allows for improved dynamic performance. Since windings can then be made around relatively smaller cores, each winding is, of course, shorter: and B) Since pole windings are layered on pole cores, the windings of each succeeding layer are necessarily slightly longer than those of the preceding layer. But when distributing an equal number of winding turns over a larger number of poles, the number of turns per pole is decreased. Therefore, the number of layers per pole is decreased, and the problem of increasing length with each layer is minimized.

As may be appreciated from an understanding of the combination of the above factors, the increase in efficiency per increased pole count is exponential rather than just linear.

Also, since, as explained previously, individual poles may be made smaller (in all dimensions) when using an increased pole count, and since the minimum height of a motor is limited only by the thickness of stator pole windings, an increased stator pole count can greatly reduce the necessary height of a motor.

Therefore, achieving the primary objectives of increased efficiency and smaller size are both obtainable by means of the expedient of increasing stator pole count. Unfortunately, prior art configurations of motors that have attempted to use this approach have resulted in devices which introduce significant undesirable performance characteristics. For example, a motor configuration wherein the coils of each phase are located within a separate sector of the circular array of electromagnetic poles. A motor constructed according to that teaching produces significant undesirable asymmetrical radial forces.

The motor of the present invention has a quantity and configuration of stator poles arranged such that:

a) 3-phase power may be used to operate the motor;
b) forces produced are symmetrical about the axis of the motor;
c) detent torque is within acceptable limits;
d) EMF ripple produced torque is minimized;
e) motor height is reduced;

f) efficiency is increased or, put in other terms, power consumption is decreased for a given running torque; and g) motor starting torque is kept sufficiently high.

In order to utilize 3-phase power without introducing an asymmetrical element into the design, the inventive motor uses a number of stator poles that is a multiple of the integer 3. In order to maintain a symmetrical winding pattern (and thus to keep radial forces symmetrical) while still disbursing total windings over a large number of electromagnetic poles (for reasons discussed previously), and while avoiding excessive interstitial insertion of coil windings between those of unlike phases (to minimize self inductance), the inventive motor utilizes a winding pattern wherein the windings of each phase are a series wound around electromagnetic poles of a contiguous group of electromagnetic poles and then around a diametrically opposed group of electromagnetic poles. This arrangement minimizes EMF torque ripple while eliminating significant asymmetrical forces. In order to minimize detent torque ripple, a number of permanent magnetic poles is utilized which minimizes the possibility of simultaneously aligned rotor/stator pole combinations. Of course, the number of permanent magnetic poles is inherently restricted such that the number must be an even integer. Accordingly, a three phase motor constructed according to the present invention utilizes 6N electromagnet poles and 6N±2 permanent magnet poles where N is any integer equal to or greater than 1.

The high pole density brushless DC motor of the presently preferred embodiment of the present invention is illustrated in an exploded perspective view in FIG. 1 and is designated therein by the general reference character 10. In most of its substantial components the motor 10 does not differ significantly from conventional brushless DC motors.

The conventional elements of the motor 10 include a rotor assembly 12, a drive shaft 14 and a stator assembly 16, including a stator stack 18 as its major component. The rotor assembly 12 is affixed to the drive shaft 14 and rotates about the axis of the drive shaft 14. The stator assembly 16 is mounted so as to be coaxial with the rotor assembly 12, but the stator assembly 16 remains stationary in respect to any surface upon which it might be mounted (not shown). The drive shaft 14 is inserted into a bearing assembly 20 which allows the rotor assembly 12 to rotate relative to the base mounting plate 22 and the stator stack 18 about an axis of rotation 23.

The rotor assembly 12 includes a rotor shell 24. The rotor shell 24 is formed such that it has a solid disklike shell end 26 and a lip 28 around the circumference of the rotor shell end 26 projecting toward the stator assembly 16. The lip 28 is sufficiently long such that when the motor 10 is assembled, the lip 28 usually reaches almost to the base/mounting plate 22 and serves to cover and protect the stator stack 18. A rotor field magnet assembly 30 is secured to the interior surface of the rotor shell lip 28 by an adhesive (not shown). In the preferred embodiment of the invention the rotor magnet assembly 30 includes ten rotor poles 32. The rotor poles 32 are permanent magnets having magnetic field strength selected dependent upon the required torque output of the motor 10. The rotor poles 32 are radially polarized with respect to the rotation axis 23, with adjacent poles 32 being polarized in opposite directions such that for each pole 32 which is radially polarized magnetically South toward the radial center of the motor 10, the adjacent poles 32 on both sides will be radially polarized magnetically North relative to the same reference. The rotor magnet assembly 30 may be integrally constructed with pole sectors 32 formed therein or may be an aggregation of distinctly formed pole elements 32. According to the present invention, each pole sector 32 is of identical size and magnitude of magnetization.

The drive shaft 14 is a rigid cylindrical shaft which is rigidly affixed to the rotor shell end 26 at a center mounting location 34. In addition to providing a mechanical axis upon which the rotor assembly 12 can rotate, the drive shaft 14 provides a means for transferring rotational forces created by the motor 10 to a disc drive assembly (not shown) or other device intended to be powered by the motor 10. The drive shaft 14 is not a part of an electrical or magnetic circuit of the motor 10.

The base plate 22 is provided with a base plate aperture 36 wherein the bearing 20 is mounted. The stator stack 18 is also rigidly affixed to the base plate 22 and includes a stator stack central aperture 38 which concentrically encircles the base plate aperture 36 and the bearing 20.

Figure 2:
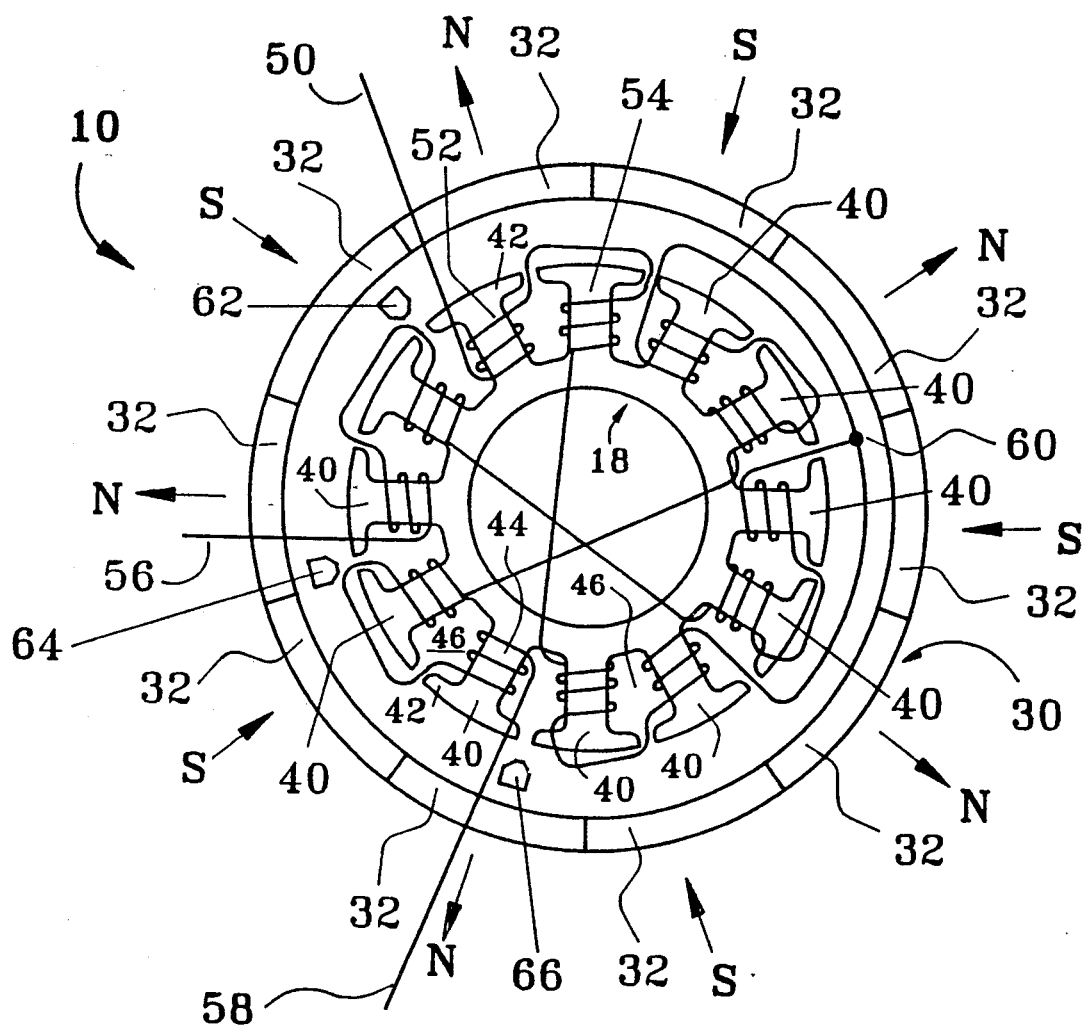
FIG. 2 is a cross sectional view, of the motor of FIG. 1 illustrating the relative radial positioning of motor elements, and also illustrating a winding pattern according to the first presently preferred embodiment of the invention.

Referring now to FIG. 2, wherein is shown a cross sectional view of the motor 10 depicting relative configurations of magnetic elements including the stator stack 18 used in the presently preferred embodiment of the present invention 10, twelve distinct stator poles 40 are evenly disbursed about the circumference of stator stack 18. The stator stack 18, itself, may be made of any of a variety of magnetically permeable materials, either soft ferromagnetic or non-ferromagnetic, according to well-known and accepted design criteria for motor electromagnetic pole construction. In the presently preferred embodiment of the motor 10, the stator stack 18 is formed of alternating layers of magnetically permeable metal and of insulating material. This construction is well-known and practiced by those skilled in the art as a means of providing an internal path for magnetic flux while preventing undesirable magnetic eddy currents. The stator poles 40 are larger at their outer edges 42 so as to more evenly disburse magnetic flux and narrower at their bases 44 so as to provide a slot 46 with sufficient room for a coil winding 48 on each stator pole 40.

As can be seen from the drawing, a phase A winding wire 50 is wound around a first stator pole 52 and then around an adjacent second stator pole 54. The windings 48 of the first stator pole 52 and the second stator pole 54 are wound in opposite directions such that when the first stator pole 52 is electrically magnetized with magnetic North arrayed radially outward, the second stator pole 54 is electrically magnetized with magnetic South radially outward. The phase A winding wire 50 is then wound around the two stator poles 40 that are diametrically opposed to the first stator pole 52 and the second stator pole 54, in such a way that those pairs of poles 40 that are exactly diametrically opposed can be simultaneously polarized to be of like outwardly radial polarization by providing a current in the phase A winding wire 50.

A phase B winding wire 56 is wound around four different stator poles 40 in a manner identical to that of the phase A winding wire 50 such that adjacent stator poles 40 are wound in opposite directions and opposite stator poles 40 are wound so as to be simultaneously polarized in a like radial direction. The choice of which four stator poles 40 are wound with the phase B winding wire 56 determines the direction of rotation of the rotor assembly 12, with the direction of rotation being from those stator poles 40 wound with the phase A winding wire 50 toward those stator poles wound with the phase B winding wire 56. The phase B winding wire 56 is wound in a direction opposite to the adjacent phase stator pole 40 which is wound with the phase A winding wire 50. A phase C winding wire 58 is wound around the four remaining stator poles 40 in a like fashion and following the conditions given herein for winding the phase B winding wire 56. The phase A input wire 50, the phase B input wire 56, and the phase C input wire 58 are then terminated at a "Y" junction termination 60.

Because of the above described layout of rotor poles 32 and stator poles 40, and as can be seen in relation to FIG. 2, only two (diametrically opposed) rotor poles 32 can align with stator poles 40 at any given position. The fact that only two (diametrically opposed) rotor poles 32 can align with stator poles 40 at any given position is illustrated in the following example: Arbitrarily assigning a position value of zero degrees to one of the stator poles 40, the stator poles can be said to be located at 0°, 30°, 60°, 90°, 120°, 150°, 180°, 210°, 240°, 270°, 300°, and 330° around the circumference of the stator assembly 16. If the rotor assembly 12 is then turned such that any of the rotor poles 32 would then be at 0°, the remainder of the rotor poles 32 would be at 36°, 72°, 108°, 144°, 180°, 216°, 252°, 288°, and 324°. In this example, only the rotor poles 32 located at 0° and at 180° are aligned with stator poles 40. Furthermore, the two oppositely aligned rotor poles 32 would, of course be of opposite polarity. Of course, the same relationship holds true no matter which stator pole 40 is chosen as the zero degree reference, and no matter which rotor pole 32 is aligned with it. The fact that no more than two rotor poles 32 can simultaneously be aligned with stator poles 40, in combination with the other aspects of the configuration discussed herein effectively prevents excell cogging torque.

An A phase Hall sensor 62, a B phase Hall sensor 64, and a C phase Hall sensor 66 are affixed to the base plate 22 and positioned such that they can sense the change in polarity of the alternately polarized rotor poles 32 as the rotor field magnet assembly 30 turns. The Hall effect sensors 62, 64 and 66 are positioned midway between stator poles 40 so as to minimize the effect of stator pole 40 magnetic fields and so as to facilitate proper timing. If the phase A Hall effect sensor 62 is nominally located at 0 degrees on the circumference of the motor 10, the phase B Hall effect sensor 64 is located at 60 degrees in the direction of rotation of rotor assembly 12, and the phase C Hall effect sensor 66 is located at 120 degrees in the direction of rotation of rotor assembly 12.

Figures 3, 4:
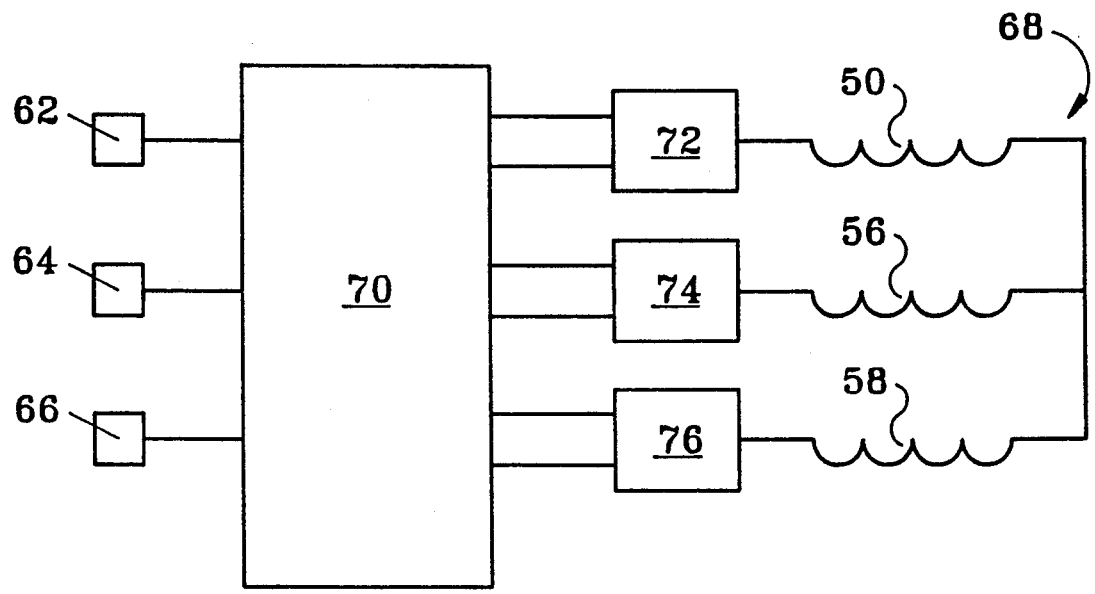
FIG. 3 is a block schematic illustration of commutation circuitry as used with the first best presently known embodiment of the inventive motor.
FIG. 4 is, a truth table showing the relationship of Hall effect sensor status to motor driver output states.

The Hall effect sensors 62, 64 and 66 are chosen such that when they are exposed to a magnetic North field they provide an output (logic state 1), and when they are exposed to a south magnetic field they provide no output (logic state 0). A block schematic of electrical circuitry used with motor 10 is shown in FIG. 3 and is designated therein by the reference numeral 68. Phase A Hall effect sensor 62, phase B Hall effect sensor 64 and phase C Hall effect sensor 66 provide inputs to a commutation logic circuit 70. A phase A bipolar driver 72, a phase B bipolar driver 74 and a phase C bipolar driver 76 provide power to the phase A winding wire 50, the phase B winding wire 56, and the phase C winding wire 58 respectively. The nature of the bipolar drivers 72, 74 and 76 is such that either a positive or negative relative potential may be applied to the coil winding wires 50, 56 and 58, according to the dictates of the commutation logic circuit 70.

Referring now to FIG. 4, wherein is shown a truth table associating various combinations of logical states of the Hall effect sensors 62, 64 and 66 with outputs of the bipolar drivers 72, 74 and 76. As can be appreciated, the cycle depicted in the table of FIG. 4 is repeated each 72 degrees of rotation of the rotor assembly 12. This is in keeping with the fact that there are ten rotor poles 32, such that five pairs of alternately polarized rotor poles 32 are disbursed about the 360 degree circumference of the rotor field magnet assembly 30. Therefore a pair of alternately polarized rotor poles 32 passes each of the Hall effect sensors 62, 64 or 66 every 360/5 degrees or 72 degrees of rotation.

Figure 5:
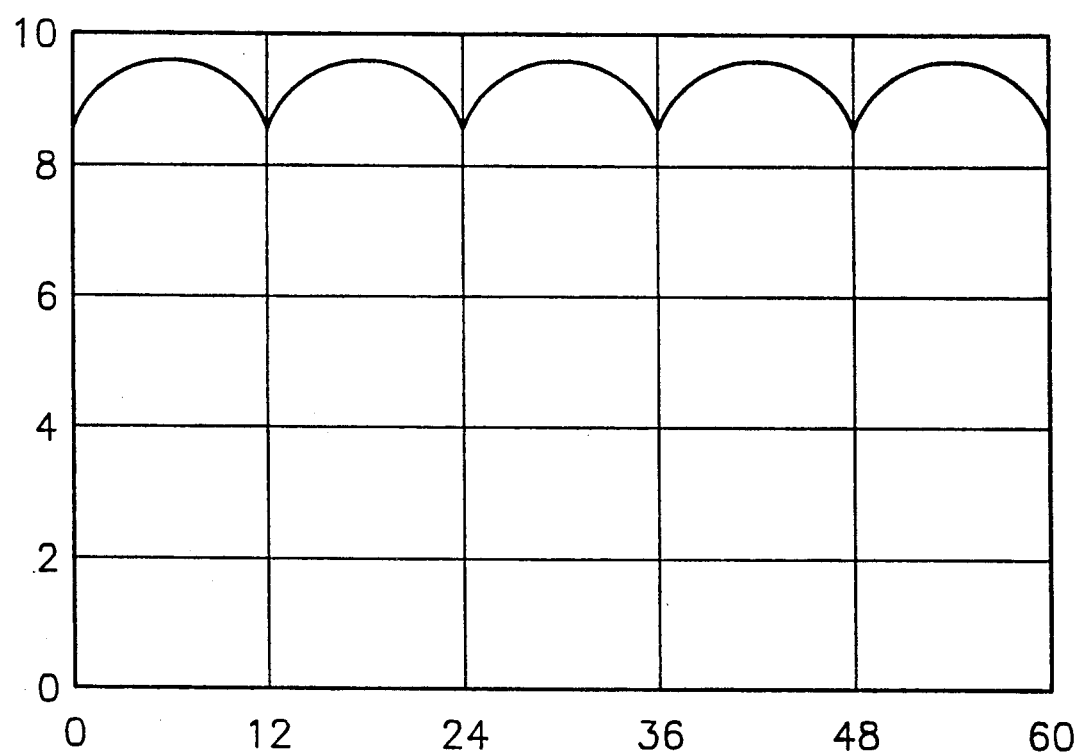
FIG. 5 is a graph representing EMF ripple of the motor versus angular position.

As can be appreciated from the above, the motor 10 of the presently preferred embodiment of the present invention experiences thirty phase changes per revolution resulting in a relatively smooth composite EMF torque curve of a relatively high frequency. Phase changes are illustrated in FIG. 5, wherein the vertical axis represents instantaneous EMF in Volts/radians/sec $\times 10^{-3}$ and the horizontal axis represents rotation angle in degrees. The combined effect of all six possible phase combinations (as illustrated in FIG. 4) is shown, and 72° of rotation is illustrated. Of course, the relationships illustrated are repeated five times per revolution. Furthermore, cogging torque is minimal, and is of a high 60 cycle per revolution rate. The combined effect of these factors is that the motor 10 has a smooth, torque curve and that whatever irregularities do exist are of a high enough frequency so as not to present a problem in expected applications.

Figure 6:
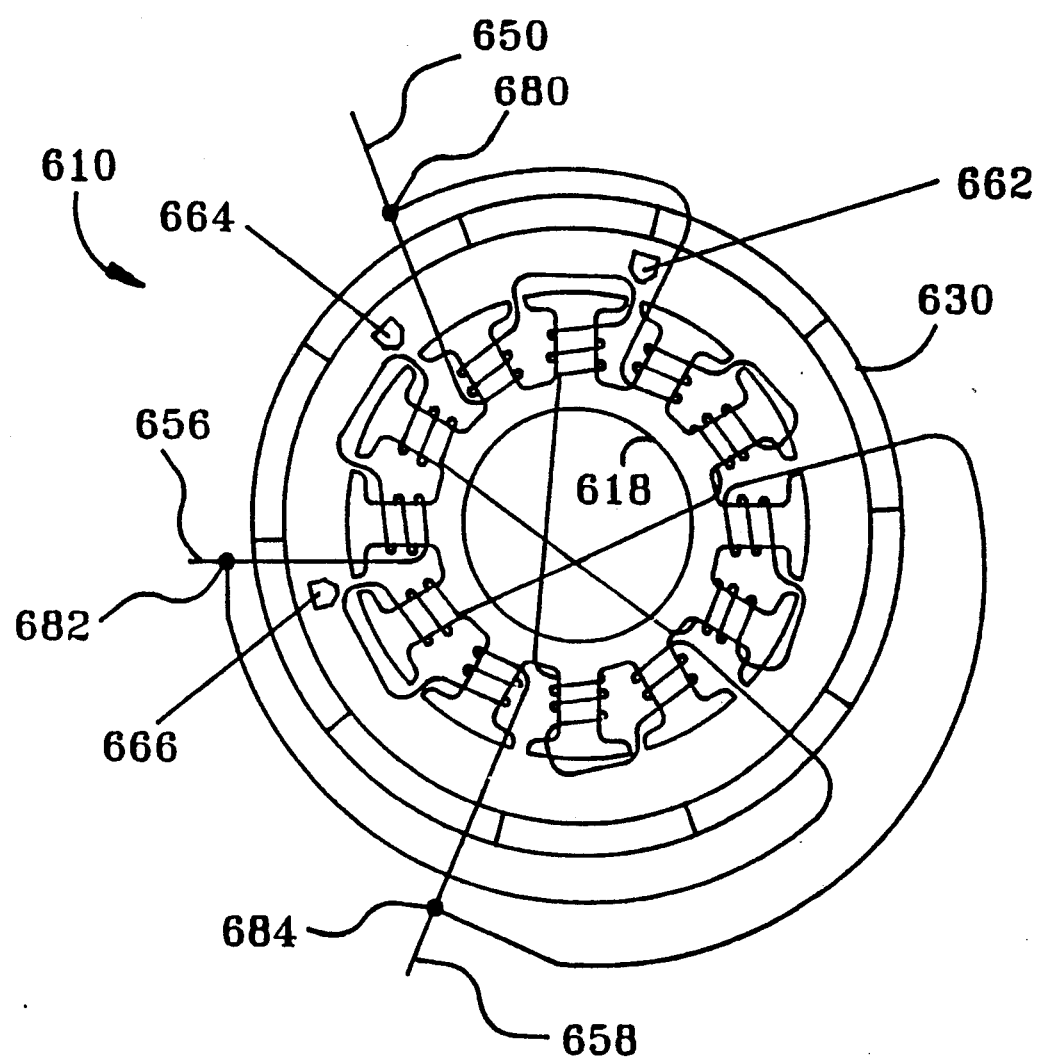
FIG. 6 is a cross sectional view similar to FIG. 2, illustrating the relative radial positioning of motor elements, and also illustrating a winding pattern according to the equally preferred alternate embodiment of the invention.

An alternate equally preferred embodiment of the invention is depicted in FIG. 6, and is designated therein by the general reference character 610. The motor 610 shares most components with the motor 10, differing only in that the motor 6100 is adapted to apply the inventive motor configuration to a "Delta" connected winding pattern, whereas the motor 10, as described previously herein, uses a "Y" type coil connection pattern. FIG. 1 is equally illustrative of both the motor 10 and the alternative embodiment 610. Likewise, the truth table of FIG. 4 is applicable to both embodiments described herein.

The stator stack 618, the rotor field magnet assembly 630 and the stator stack poles 640 of the alternative embodiment 6100 are all identical to and interchangeable with the stator stack 18, the rotor field magnet assembly 30 and the stator stack poles 40, respectively, of the first preferred embodiment 10 (FIG. 2). Furthermore, the phase A winding wire 650, the phase B winding wire 656 and the phase C winding wire 658 are wound around the stator stack poles 640 in the same pattern and in like fashion as are the phase A winding wire 50, the phase B winding wire 56 and the phase C winding wire 58 wound around the stator stack poles 40 of the first preferred embodiment of the invention 10 (FIG. 2). The A phase Hall sensor 662, the B phase Hall sensor 664 and the C phase Hall sensor 666 are like their corresponding parts in the preferred embodiment 10 and, like the Hall sensors 62, 64 and 66 of the preferred embodiment of the invention 10, are positioned consecutively (according to the intended direction of rotation of the rotor field magnet assembly 630) between alternating pairs of stator stack poles 640, as depicted in the drawing.

Figure 7:
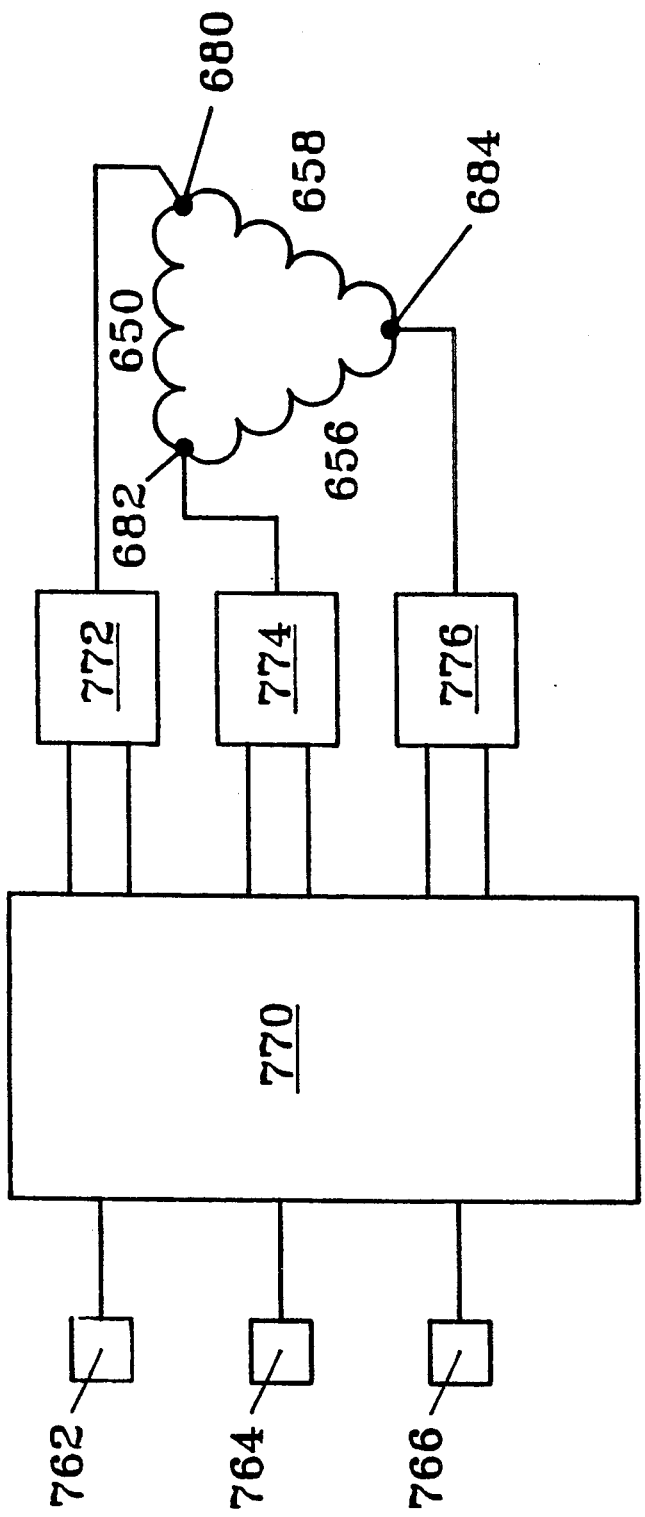
FIG. 7 is a block schematic illustration similar to FIG. 3, the commutation circuitry as used with the equally preferred alternate embodiment of the invention.

Referring now to FIG. 7, wherein is shown electrical control circuitry for use with the alternate preferred embodiment of the invention 610, it can be seen that the commutation logic circuit 670 is connected to the Hall sensors 662, 664 and 668 and to a phase A driver 672, and phase B driver 674 and a phase C driver 676 in a similar manner to the corresponding parts of the first preferred embodiment of the invention 10, as is depicted in FIG. 3. As in the first embodiment of the invention 10, the drivers 672, 674 and 676 are connected to and supply power to their respective coil windings 650, 656 and 658.

As is shown in both FIG. 6 and FIG. 7, it can be seen that the substantial difference between the first preferred embodiment 10 and the alternate preferred embodiment 610 lies in the fact that the three phase winding wires 650, 656 and 658 are connected in a delta configuration. This configuration is accomplished by, instead of the connecting the three phase winding wires 650, 656 and 658 together (which connection would correspond to the "Y" junction termination 60 (FIG. 2) of the first preferred embodiment), the A phase wire 650 is joined to the C phase wire 658 at an A/C junction point 680, the B phase wire 656 is joined to the A phase wire 650 at an B/A junction point 682, the C phase wire 658 is joined to the B phase wire 656 at an C/B junction point 684, as is depicted in the drawing.

Various other modifications may be made to the invention without altering its value or scope. For example, while the invention has been described herein in terms of a motor having a central stator section and an outer rotor section, the invention could be embodied in a motor or the type having a central rotor section.

Further, while the invention has been described herein in terms of a brushless motor having Hall effect sensors as commutation devices, brushes or other commutation means might also be employed to practice the invention.

All of the above are only some of the examples of available embodiments of the invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

As disclosed herein, the present invention relates to a motor having 6N electromagnetic poles and 6N±2 permanent magnet poles, where N is any integer equal to or greater than 1. The best presently known embodiment, as described herein, incorporates 12 electromagnetic poles and 10 permanent magnet poles. Of course, other combinations, such as 12 electromagnetic poles and 14 permanent magnet poles, or 24 electromagnetic poles and 22 permanent magnet poles are within the scope of the invention.

INDUSTRIAL APPLICABILITY

The improved three phase DC motor assembly of the present invention is adaptable to a variety of applications. The particular use for which the improved motor assembly was developed is for computer rotating media disk drives, particularly drives using media of equal to or less than 3.5 inch diameter.

Since it is anticipated that disk drives as described above will be utilized in many forthcoming applications, including portable computers and other applications requiring high efficiency and low profile, a motor constructed according to the present invention is particularly desirable. The improved efficiency of the inventive motor will provide a longer running time per battery charge in portable computers and will provide increased starting torque per available power. The low ripple torque magnitude and high ripple torque frequency make the inventive motor particularly well suited to hard disk drive applications. Finally, the symmetrical winding pattern according to the inventive configuration of rotor and stator poles will make the inventive motor more useful for the intended application than similar motors with asymmetrical winding patterns and resultant asymmetrical radial forces.

For these and other reasons, it is expected that the utility and industrial applicability of the invention will be both significant in scope and long lasting in duration.

I claim:

1. An improved direct current electric motor comprising:
   a rotor portion including a ferromagnetic ring magnet divided into 6N±2 alternately polarized permanently magnetized zones of equal size and shape, where N is any positive integer greater than 1;
   a stator portion including a rigid magnetically conducting stator core and a plurality of conducting windings wrapped thereabout, the stator core including 6N of symmetrically arrayed pole portions of equal size;
   rotational means for allowing said rotor portion to rotate with respect to said stator portion, and for transferring power from the motor; and
   electrical power and control means for operating the motor, wherein;
   said pole portions are arranged such that there is a plurality of opposing pairs of said pole portions, said opposing pairs each comprising two of said pole portions which are diametrically opposed across a circumference of said stator core;
   said plurality of conducting windings includes a first winding wire, a second winding wire and a third winding wire, with each of said first, second and third winding wires being wrapped around 6N/3 of said poles such that:
   each of said first winding wire, said second winding wire and said third winding wire is wrapped around at least one of said opposing pairs of said pole portions.

2. The improved motor of claim 1, wherein:
   said first winding wire, said second winding wire and said third winding wire are connected in a Y configuration by being joined at a Y junction point such that each of said winding wires has a junction end which is connected at said Y junction point and a free end; and
   each of said first winding wire, said second winding wire and said third winding wire is connected at its free end to one each of an A phase, a B phase and a C phase leg of a three phase power source.

3. The improved motor of claim 1, wherein:
   said first, second and third winding wires are connected in a delta configuration by joining said first winding wire to said second winding wire at a first junction point, said second winding wire to said third winding wire at a second junction point, and said third winding wire to said first winding wire at a third junction point; and
   each of said first junction point, said second junction point and said third junction point is connected to one each of an A phase, a B phase and a C phase leg of a three phase power source.

* * * * *